Dec. 5, 1961 S. KAVESH 3,012,024
DRY FEED IN FORMING SLURRY IN OLEFIN POLYMERIZATION
Filed Nov. 25, 1957
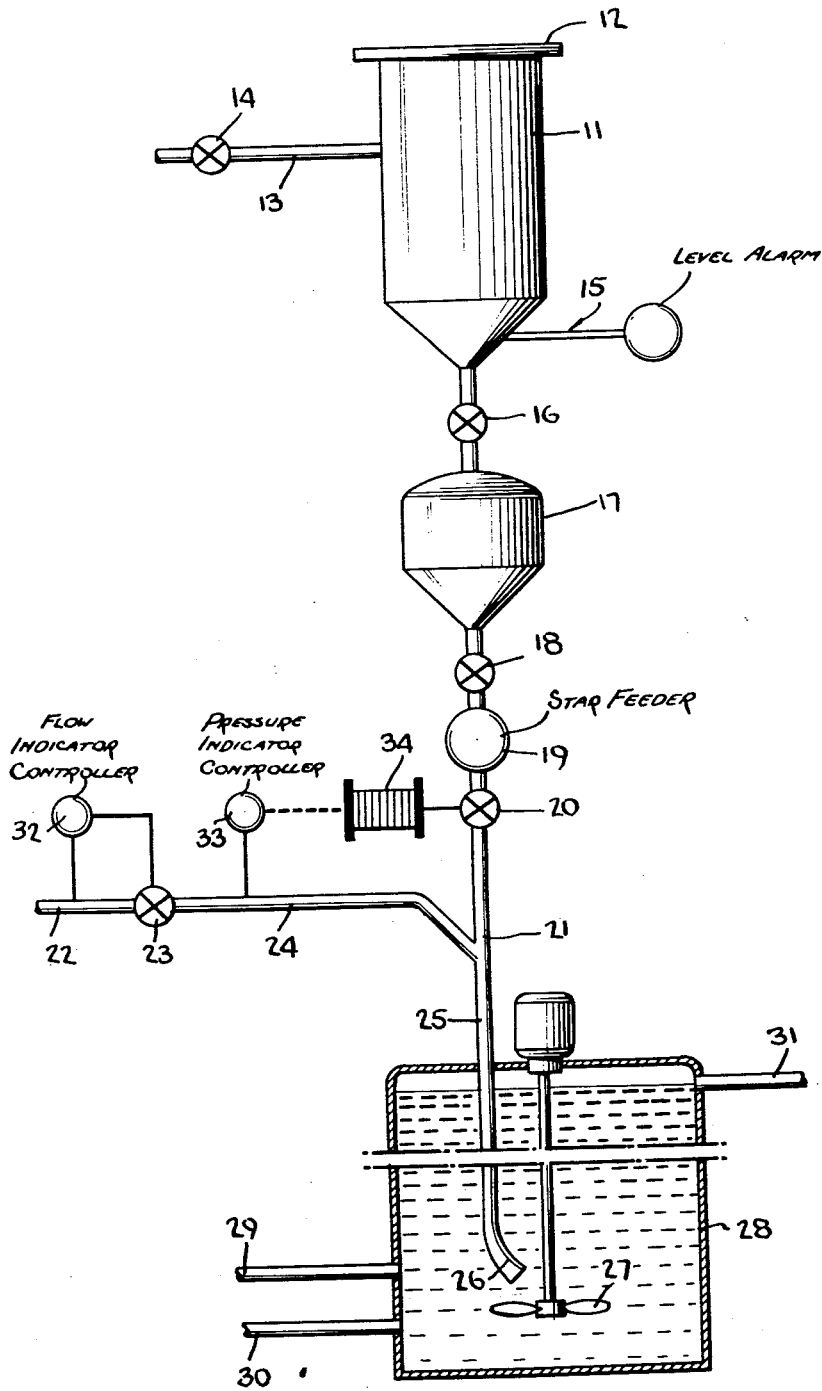

United States Patent Office 3,012,024
Patented Dec. 5, 1961

3,012,024
DRY FEED IN FORMING SLURRY IN OLEFIN POLYMERIZATION
Sheldon Kavesh, Orange, N.J., assignor to Celanese Corporation of America, New York, N.Y., a corporation of Delaware
Filed Nov. 25, 1957, Ser. No. 698,612
7 Claims. (Cl. 260—94.9)

The present invention relates to a novel process and apparatus for the introduction of dry solid material into a vessel under pressure. More particularly, the invention relates to the introduction of dry catalyst into a polyolefin reactor.

In one process for the polymerization of vinyl monomers such as the olefin ethylene, the polymerization is effected under pressure in a vessel containing a solvent such as cyclohexane or xylene having a solid catalyst suspended therein. The catalyst comprises a mixture of various oxides or a mixture of an aluminum alkyl with a metal halide such as titanium or zirconium chloride. In preparing the reaction medium, the catalyst has heretofore been suspended in the solvent and portions of the suspension have been added to solvent in the reaction vessel as required, the contact time between catalyst and solvent prior to introduction into the reaction vessel averaging several hours.

It is an object of the present invention to provide a new process for forming a suspension of catalyst in solvent within the reaction vessel.

It is a further object of the invention to provide a novel apparatus for introducing the catalyst in to the reaction vessel.

Other objects and advantages of the invention will become apparent from the following detailed description and claims.

It has been found that the efficiency of the catalyst used to polymerize olefins, as measured by the weight of polymer produced per unit weight of catalyst consumed, will be decreased if there is prolonged contact between the catalyst and reaction solvent prior to introduction into the reactor. In accordance with the present invention it has been found that the catalyst efficiency can be increased by introducing the catalyst into the reactor as a dry solid. To this end, the dry catalyst is metered under pressure into the reactor where the catalyst is there suspended in the reaction solvent, the catalyst preferably being carried into the reactor by a flowing stream of gas.

Where there is a gas space at the top of the reactor, the catalyst can be dropped thereinto. Whether or not the reactor is liquid filled, however, to improve dispersion of the catalyst it is preferably introduced below the level of liquid. To this end the catalyst must be conveyed under pressure greater than that under which the liquid is placed. This is conveniently effected by a pressurized gas which carries the catalyst through a conduit into the liquid at a linear velocity of at least about 5 feet per second and preferably at least 7 feet per second in order to prevent clogging of the conduit due to agglomeration of catalyst when wet with reaction solvent or due to formation of polymer at the mouth of the conduit. High catalyst feed rates will generally require high gas linear velocities because of the greater likelihood of plugging. Low gas linear velocities will be adequate with low catalyst feed rates since there is less likelihood of plugging at the mouth of the conduit.

The pressurized gas for suspending and conveying the dry catalyst can be an inert gas such as nitrogen, carbon dioxide, argon, and the like, but preferably it comprises either in whole or in part the material to be polymerized, e.g. ethylene gas.

The composition of the catalyst will depend upon the nature of the monomer or monomers being reacted and upon the nature of the polymers desired to be produced. In the polymerization of an olefin such as ethylene, for example, the preferred catalysts comprise those materials disclosed in Belgian Patent 530,617, such as metal oxides on a support, e.g. chromium oxide on silica, alumina, mixtures thereof, and the like. The amount of chromium oxide in the catalyst may range from 0.1 to 10 or more weight percent of the support. The preferred support is a silica-alumina composite containing a predominant portion of silica and a minor portion of alumina by weight, e.g. 90–10 silica-alumina. The catalyst, prior to being fed to the reactor, is usually activated with air at a temperature in the range of 750 to 1500° F. for a period of 3 to 10 hours or more. The particle size of the catalyst preferably ranges between about 2 and 200 microns although smaller particles as well as larger particles up to ½ inch pellets or more can be used.

Monomers which can be polymerized in accordance with the invention include olefins such as ethylene, propylene, 1- and 2-butene, 1- and 2-pentene, 1- and 2-hexene, 1- and 2-octene, 1-dodecene, isobutylene, 2-methyl-1-butene, 3-methyl-1-butene, 4-methyl-1-pentene, 4-vinylcyclohexene, 2-methyl-2-butene, cyclohexene, butadiene, isoprene, mixtures thereof, and the like. Of these, the preferred monomers are those which give higher molecular weight solid polymers, i.e. 1-olefins of maximum monomer chain length of about 8 carbon atoms and no branching nearer the double bond than the 4-position. Diolefins also produce solid polymers if they have a terminal double bond. In the case of conjugated diolefins, a substituent such as a methyl, chloro or ethyl group can be closer than the 4-position, e.g. as close as the 3-position to the terminal double bond.

The polymerization is preferably effected in an inert hydrocarbon solvent such as propane, butane, isobutane, n-pentane, isopentane, isooctane, hexane, cyclohexane, methylcyclohexane, decalin, tetralin, benzene, toluene, xylene, mixtures thereof, and the like. Of these, cyclohexane is particularly useful.

The temperature of polymerization normally ranges from about 150 to 450° F. with 240° F. to 325° F. being preferred for ethylene and 150° F. to 250° F. being preferred for propylene and higher 1-olefins.

The pressure must be high enough to maintain the solvent in the liquid phase and to assure that monomers not liquefied under the prevailing conditions dissolve in the liquid phase in sufficient amount. This generally requires a pressure of at least 100 to 300 p.s.i.g.

By feeding the catalyst to the reactor in accordance with the invention, the catalyst efficiency is higher and less catalyst is needed to polymerize a given weight of monomer. In addition to the obvious saving due to the use of less catalyst, considerable power is saved in separating solid waste catalyst from the polymer solution. The size of equipment for handling solid waste from a plant producing a given weight of polymer will be decreased with attendant savings in equipment cost. Moreover, the increased catalyst efficiency reduces the proportion of catalyst impurities carried into the end product so that an improved product is obtained.

The invention will now be described more fully with reference to the accompanying drawing schematically showing partially in elevation and partially in section an apparatus for introducing dry catalyst in to a pressurized reaction vessel.

Referring now more particularly to the drawing, there is shown a catalyst hopper 11 having a cover 12 sealing its mouth, and an inlet 13 with a valve 14 for supplying a gas to bring the pressure within the hopper to a predetermined level. A level alarm 15 indicates when the hopper 11 must be refilled. The hopper 11 discharges through a valve 16 into a secondary hopper 17, which communicates with a ball valve 18 and discharges into a solids metering device such as a star feeder 19, a ball valve, a plug valve or any equivalent structure capable of being cyclically operated. The star feeder 19 in turn discharges through a solenoid operated valve 20 into one branch of a Y-tube 21.

Compressed gas flows in a line 22 past a throttling valve 23 and into a pipe 24 which communicates with the other branch of Y-tube 21. The gas sweeps solid in Y-tube 21 through a conduit or downcomer 25 which terminates in a flared end 26 adjacent the agitator 27 of a reactor 28. Additional solvent is fed to reactor 28 through a pipe 29 and monomer to be polymerized is fed through a pipe 30. The reactor 28 continuously discharges through a pipe 31.

In operation, a flow indicator control 32 serves either to open or close valve 23 partially to maintain a predetermined flow rate of carrier gas. A pressure indicator control 32 is included as a safeguard against plugging of the downcomer 25. If the downcomer 25 is partially clogged, the pressure in line 24 will build up and thus tend to remove the obstruction. If downcomer 25 is completely clogged, the pressure in line 24 will rise still higher. Control 33 will actuate solenoid 34 to close valve 20 thereby terminating solids feed into Y-tube 21 and preventing gas in the Y-tube from backing up toward the hoppers and prematurely contacting the catalyst. Valve 20 does not open until the downcomer is blown clean by the high pressure in line 24.

During normal operation, the gas supplied to hopper 11 through inlet 13 prevents leakage of gas from Y-tube 21 back through star feeder 19 into the hopper. Thus, where ethylene is introduced at line 21, introduction of nitrogen at inlet 13 will prevent contact between ethylene and the catalyst before the catalyst reaches Y-tube 21. The pressure in hopper 11 also serves to decrease the pressure differential across the star feeder 19 which favors satisfactory operation thereof.

When the catalyst in hopper 11 is almost exhausted, as indicated by alarm 15, valve 16 is closed and further catalyst feed takes place from the supply in secondary hopper 17. Hopper 11 is recharged, valve 16 is opened and normal operation is resumed.

If desired, two star feeders 19 may be provided in parallel, with suitable valving, so that when one has to be repaired the other can be employed, thereby avoiding interruption of operation.

The following example is given by way of illustrating the present invention.

*Example*

Ethylene is polymerized in cyclohexane in the reaction vessel 28 at a pressure of 420 p.s.i.g. using as catalyst chromium oxide on a support composed of 86 parts by weight of silica and 14 parts by weight of alumina, the chromium content of the chromium oxide-silica-alumina catalyst constituting 2.3% by weight. The catalyst is charged into hopper 11 which is pressurized to 440 p.s.i.g. with nitrogen admitted through inlet 13. Ethylene gas at 700 p.s.i.g. is throttled through valve 23 into conduit 24 at a pressure of 425 p.s.i.g., valves 16 and 18 are opened and star feeder 19 is rotated to pass catalyst to the Y-tube 21 at the rate of 4.2 parts by weight per hour. Ethylene passes through the Y-tube at the rate of 103 parts by weight per hour and the suspension of solid catalyst in ethylene (plus some nitrogen carried with the catalyst from the hopper) passes into the reactor at a velocity of 43 feet per second. Cyclohexane is added to the reactor at the rate of 9,150 parts by weight per hour and ethylene is added through line 30 at the rate of 1,280 parts by weight per hour. The reactor effluent is discharged through pipe 31 and after separating unconverted ethylene and catalyst, the solvent is distilled off to leave polyethylene.

It is to be understood that the foregoing detailed description is given merely by way of illustration and that many variations may be made therein without departing from the spirit of my invention.

Having described my invention, what I desire to secure by Letters Patent is:

1. In the polymerization of an olefin in a solvent having a solid catalyst slurried therein, wherein catalyst, solvent and olefin are continuously contacted in a reactor for polymerization and a portion of the reactor contents is continuously withdrawn for recovery of its polyolefin content, the improvement which comprises continuously adding said catalyst to a zone which communicates with said reactor below the level of solvent therein, and introducing a gas into said zone at a pressure sufficient to carry said solid catalyst therewith into said reactor so that said catalyst enters said reactor in dry condition first contacting said solvent within said reactor at a location beyond that at which said gas first enters said reactor.

2. In the polymerization of an olefin in a solvent having a solid catalyst slurried therein, wherein catalyst, solvent and olefin are continuously contacted in a reactor for polymerization and a portion of the reactor contents is continuously withdrawn for recovery of its polyolefin content, the improvement in slurrying said catalyst in said solvent which comprises introducing solid catalyst into a zone which communicates with said reactor at a location below the level of solvent therein, said catalyst being added in dry condition without previous contact with said solvent, and introducing a gas into said zone at a pressure sufficient to carry said solid catalyst therewith into said reactor at a linear gas flow rate of at least about five feet per second.

3. In the polymerization of an olefin in a solvent having a chromium oxide-containing catalyst slurried therein, wherein catalyst, solvent and olefin are continuously contacted in a reactor for polymerization and a portion of the reactor contents is continuously withdrawn for recovery of its polyolefin content, the improvement in slurrying said catalyst in said solvent which comprises passing solid catalyst from a space to a zone which communicates with said reactor at a location below the level of solvent therein, said catalyst being added in dry condition without previous contact with said solvent, and introducing a first gas into said zone at a pressure sufficient to carry said solid catalyst therewith into said reactor at a linear gas flow rate of at least about seven feet per second, said space from which solid catalyst is fed being maintained under pressure of a second gas so as to prevent back flow of said first gas into said space for premature contact between said first gas and said solid catalyst.

4. The process as set forth in claim 3, wherein said solvent comprises cyclohexane.

5. The process set forth in claim 3, wherein said olefin and said first gas comprise ethylene and said second gas is nitrogen.

6. Apparatus for introducing solid catalyst into a solvent-containing reactor operating under pressure, comprising a closed hopper, a downcomer communicating with said hopper and extending into said reactor below the solvent level therein, valve means controlling flow of catalyst from said hopper into said downcomer, gas supply means for admitting a gas to said downcomer at a pressure greater than that of said reactor, thereby to force solid catalyst into the solvent within said reactor, and pressure responsive means operatively connected between said gas supply means and said valve means, whereby in the event of obstruction of said downcomer the pressure in said gas supply means will build up and said pressure responsive means will close said valve means to interrupt supply of solid catalyst until the obstruction is blown out by pressurized gas.

7. Apparatus as set forth in claim 6, wherein said reactor is provided with an agitator, said downcomer terminating adjacent said agitator to facilitate slurrying of said catalyst.

References Cited in the file of this patent

UNITED STATES PATENTS

| | | |
|---|---|---|
| 2,433,798 | Voorhes | Dec. 30, 1947 |
| 2,761,889 | May et al. | Sept. 4, 1956 |
| 2,815,334 | Killey et al. | Dec. 3, 1957 |
| 2,820,779 | Dale | Jan. 21, 1958 |
| 2,824,089 | Peters | Feb. 18, 1958 |
| 2,825,721 | Hogan et al. | Mar. 4, 1958 |
| 2,827,446 | Breslow | Mar. 18, 1958 |
| 2,843,577 | Friedlander | July 15, 1958 |
| 2,846,426 | Larson et al. | Aug. 5, 1958 |
| 2,908,734 | Cottle | Oct. 13, 1959 |
| 2,910,461 | Nowlin et al. | Oct. 27, 1959 |

FOREIGN PATENTS

| | | |
|---|---|---|
| 785,314 | Great Britain | Oct. 23, 1957 |